(12) United States Patent
Deigmöller et al.

(10) Patent No.: US 9,987,898 B2
(45) Date of Patent: Jun. 5, 2018

(54) PREDICTIVE SUSPENSION CONTROL FOR A VEHICLE USING A STEREO CAMERA SENSOR

(71) Applicant: HONDA RESEARCH INSTITUTE EUROPE GMBH, Offenbach/Main (DE)

(72) Inventors: Jörg Deigmöller, Offenbach (DE); Nils Einecke, Offenbach (DE); Herbert Janssen, Offenbach (DE); Oliver Fuchs, Offenbach (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 0 days. days.

(21) Appl. No.: 15/361,632

(22) Filed: Nov. 28, 2016

(65) Prior Publication Data

US 2017/0151850 A1    Jun. 1, 2017

(30) Foreign Application Priority Data

Dec. 1, 2015 (EP) ..................................... 15197309
Dec. 22, 2015 (EP) ..................................... 15201963

(51) Int. Cl.
*B60G 17/00* (2006.01)
*G06K 9/00* (2006.01)
(Continued)

(52) U.S. Cl.
CPC ....... *B60G 17/0165* (2013.01); *B60G 17/019* (2013.01); *B60G 17/01908* (2013.01);
(Continued)

(58) Field of Classification Search
CPC .................. B60G 17/00; B60G 17/019; B60G 17/01908; G06K 9/00; G06K 9/00805; H04N 13/00; H04N 13/0203
See application file for complete search history.

(56) References Cited

U.S. PATENT DOCUMENTS

2004/0098185 A1* 5/2004 Wang .................... B60T 8/1706
701/70
2010/0157058 A1   6/2010 Feiden
(Continued)

FOREIGN PATENT DOCUMENTS

EP          2574511 A1    4/2013

OTHER PUBLICATIONS

European Search Report application No. 152019614 dated Apr. 20, 2017.

*Primary Examiner* — Yonel Beaulieu
(74) *Attorney, Agent, or Firm* — Squire Patton Boggs (US) LLP

(57) ABSTRACT

Embodiments of the invention address the area of predictive suspension control system for a vehicle, particularly a two-wheel vehicle such as a motor cycle or a scooter. The system includes a stereo sensor unit which for generating image data, a computing unit which extracts a relevant image portion from the image data based on future vehicle path data, and calculates road unevenness on a future vehicle path of the vehicle based on the generated image data. A suspension control unit generates an adaptation signal for adapting the suspension based on the calculated road unevenness. The computing unit adapts a search direction of a stereo algorithm or a correlation area of the stereo algorithm based on a lean angle of the vehicle to generate the three-dimensional partial image data from the relevant image portion, and fits
(Continued)

a road model to the three-dimensional partial image data to calculate the road unevenness.

21 Claims, 7 Drawing Sheets

(51) Int. Cl.
  H04N 13/00      (2018.01)
  B60G 17/0165    (2006.01)
  H04N 13/02      (2006.01)
  B60G 17/019     (2006.01)
  B62J 99/00      (2009.01)
  B62K 25/04      (2006.01)

(52) U.S. Cl.
  CPC ..... *G06K 9/00805* (2013.01); *H04N 13/0203* (2013.01); *B60G 2300/12* (2013.01); *B60G 2400/20* (2013.01); *B60G 2400/82* (2013.01); *B60G 2400/821* (2013.01); *B60G 2401/14* (2013.01); *B60G 2401/28* (2013.01); *B60G 2500/00* (2013.01); *B62J 2099/002* (2013.01); *B62K 2025/044* (2013.01); *B62K 2207/02* (2013.01)

(56) References Cited

U.S. PATENT DOCUMENTS

| 2013/0011013 | A1* | 1/2013  | Takiguchi  | G01C 21/3602 |
|              |     |         |            | 382/103      |
| 2013/0304319 | A1* | 11/2013 | Daniels    | B60G 17/08   |
|              |     |         |            | 701/38       |
| 2014/0029792 | A1* | 1/2014  | Kato       | B60Q 1/08    |
|              |     |         |            | 382/103      |
| 2015/0228079 | A1  | 8/2015  | Murarka et al. | |
| 2015/0347831 | A1* | 12/2015 | Tamatsu    | H04N 5/144   |
|              |     |         |            | 382/156      |
| 2017/0082757 | A1* | 3/2017  | Kunkel     | G01S 19/40   |

* cited by examiner

PREDICTIVE SUSPENSION CONTROL FOR A VEHICLE USING A STEREO CAMERA SENSOR

BACKGROUND

Field

The invention is in the area of predictive driving assistance systems for vehicles. In particular, a predictive suspension control system and a corresponding method and computer program for a vehicle such as a two-wheel vehicle, a scooter or a motorcycle, and using a stereo camera sensor, is proposed.

Description of the Related Art

Adapting a vehicle's suspension to different and varying road conditions is a developing area in automobile development. In the domain of two-track vehicles, improving driving comfort by adapting the parameters of the wheel suspension depending on the road surface conditions is known. These systems adapt the technical characteristics of the suspension based on events such as vibrating wheels, braking or acceleration actions of the vehicle.

A more recent generation addresses the adaption of the suspension of a vehicle by predicting road surface conditions ahead of the vehicle and adapting suspension parameters in advance, meaning before the wheel actually encounters the change in the road surface conditions which makes an adaptation in the vehicle's suspension characteristics desirable. Magic Body Control System scan the road ahead of the vehicle using a stereo camera, detect single road surface irregularities ahead of the vehicle and adapt the characteristics of the suspension of the wheels accordingly in advance. However such predictive suspension control is only provided by one system for two-track vehicles by addressing challenging timing and processing requirements. Thus the efficiency of the system is restricted to a predetermined vehicle speed envelope.

Active body control systems have been introduced into the area of single track vehicles such as motor cycles and scooters. However the processing restrictions and in particular the increased dynamic driving characteristics of the single-track vehicle compared to the two-track vehicle prevented the introduction of predictive suspension control systems to the field of single-tack vehicles.

Thus the technical problem of predictive suspension control for vehicles extended dynamic characteristics at severe restrictions concerning space and processing capabilities is to be addressed.

SUMMARY

The system for adapting a suspension of a vehicle as disclosed herein, and the corresponding method and computer program solve the technical problem.

A system for adapting a suspension of a vehicle, the system comprising a stereo sensor unit configured to generate image data, a computing unit configured to extract a relevant image portion from the image data based on future vehicle path data, and to calculate a road unevenness on a future vehicle path of the vehicle based on the generated image data and a suspension control unit configured to generate an adaptation signal for adapting the suspension based on the calculated road unevenness. The system for adapting a suspension of a vehicle is characterized by the computing unit being configured to adapt a search direction of a stereo algorithm or a correlation area of the stereo algorithm based on a lean angle of the vehicle to generate three-dimensional partial image data from the relevant image portion, and the computing unit further being configured to fit a road model to the three-dimensional partial image data to calculate the road unevenness.

The system for adapting the suspension of the vehicle scans the road unevenness in front of the vehicle, for example a motorcycle, for adapting the suspension. The system detects single road surface irregularities like bumps or edges up to high vehicle speeds. The road surface scanning of the system for adapting the suspension has a short reaction time and high precision. This is achieved by the adapting of the scanning area in the image data to save computation time. Only areas in the image data that the front wheels will pass due to being an estimated future vehicle path are of interest and need to be processed. Other image parts are ignored. For motorcycles, this is particular advantageous, because the track of only a single front wheel has to be processed in the image, instead of two tracks in case of a two-track vehicle. A further important advantage of the system is the adaptation of the image processing to cope with the more dynamic movements. This is also particularly advantageous for motorcycles in comparison to cars.

Advantageous embodiments of the system for predictive adapting the suspension of the vehicle form part of the dependent claims.

A preferred embodiment of the system is characterized by the stereo sensor unit is a stereo camera.

It is advantageous when the system comprises a stereo sensor unit configured to generate the image data which images an area in a driving direction of the vehicle.

The system according to a preferred embodiment comprises a vehicle path estimation unit configured to calculate future vehicle path data from at least one of vehicle dynamic data and vehicle geometry data.

An advantageous embodiment of the system comprises a vehicle path estimation unit configured to calculate future vehicle path data based on the lean angle and a vehicle speed.

A preferred system according to an embodiment comprises a lean angle estimation unit configured to determine the lean angle based on data from a gyroscope and/or a previous lean angle determined at predetermined time before and/or visual odometry.

The system according to an embodiment is characterized in that the stereo algorithm is a block-matching algorithm or a semi-global matching algorithm.

A preferred embodiment of the system has image data comprising a first image and a second image, and the computing unit is configured to generate three-dimensional partial image data by transforming the relevant portion of the first image to the second image based on a previous road model estimation.

An embodiment of the system has the first image being a left image and the second image being right image, or the first image being a right image and the second image being left image.

The system comprises the computing unit of an embodiment being configured to adapt at least one of a filter size, a filter shape and a filter orientation of the stereo algorithm based on the lean angle.

The system according to an embodiment includes the computing unit configured to rotate the first image and the second image.

The road model of a preferred embodiment is a planar model.

The computing unit of an advantageous embodiment is configured to determine uneven road sections based on the three-dimensional partial image data and the road model.

A preferred embodiment of the system includes the computing unit configured to calculate a three-dimensional elevation map based on the three-dimensional partial image data and the road model.

The computing unit of an embodiment is configured to calculate the road unevenness based on a distance of each data point of the three-dimensional partial image data to a corresponding model data point of the fitted road model.

The system according to an advantageous embodiment includes the suspension control unit which is configured to generate the adaptation signal further based on a distance of the vehicle at a time when generating the image data to a detected unevenness in the future vehicle path, based on a vehicle velocity.

The suspension control unit of another embodiment is configured to generate the adaptation signal further taking into account an influence of the calculated road unevenness in the future vehicle path on the vehicle.

The computing unit can be configured to calculate the road unevenness as a three-dimensional road surface profile, and that the suspension control unit is configured to generate the adaptation signal as a suspension adaptation profile over time based on the three-dimensional road surface profile.

The system according to an embodiment is installed in a two-wheel vehicle, in particular a motorcycle or a scooter.

The technical problem is solved by a method for adapting a suspension of a vehicle, the method comprising steps of generating, by a stereo sensor unit, image data, extracting by a computing unit, a relevant image portion from the image data based on future vehicle path data, calculating, by the computing unit, three-dimensional partial image data by using a stereo algorithm, adapting a search direction of the stereo algorithm or adapting a correlation area of the stereo algorithm to generate three-dimensional image data based on a lean angle of the vehicle, fitting, by the computing unit, a road model to the three-dimensional partial image data to calculate a road unevenness based on the three-dimensional partial image data, and generating, by a suspension control unit, an adaptation signal for adapting the suspension based on the calculated road unevenness.

The technical problem is solved by a computer program with program-code means for executing the steps according to method for adapting a suspension of a vehicle, when the program is executed on a computer or digital signal processor.

BRIEF DESCRIPTION OF THE DRAWINGS

An embodiment of the inventions is presented based on the attached figures, in which.

DETAILED DESCRIPTION

In the figures same numerals denote the same features and are not necessarily repeated in the description for all of the figures.

Figure 1:
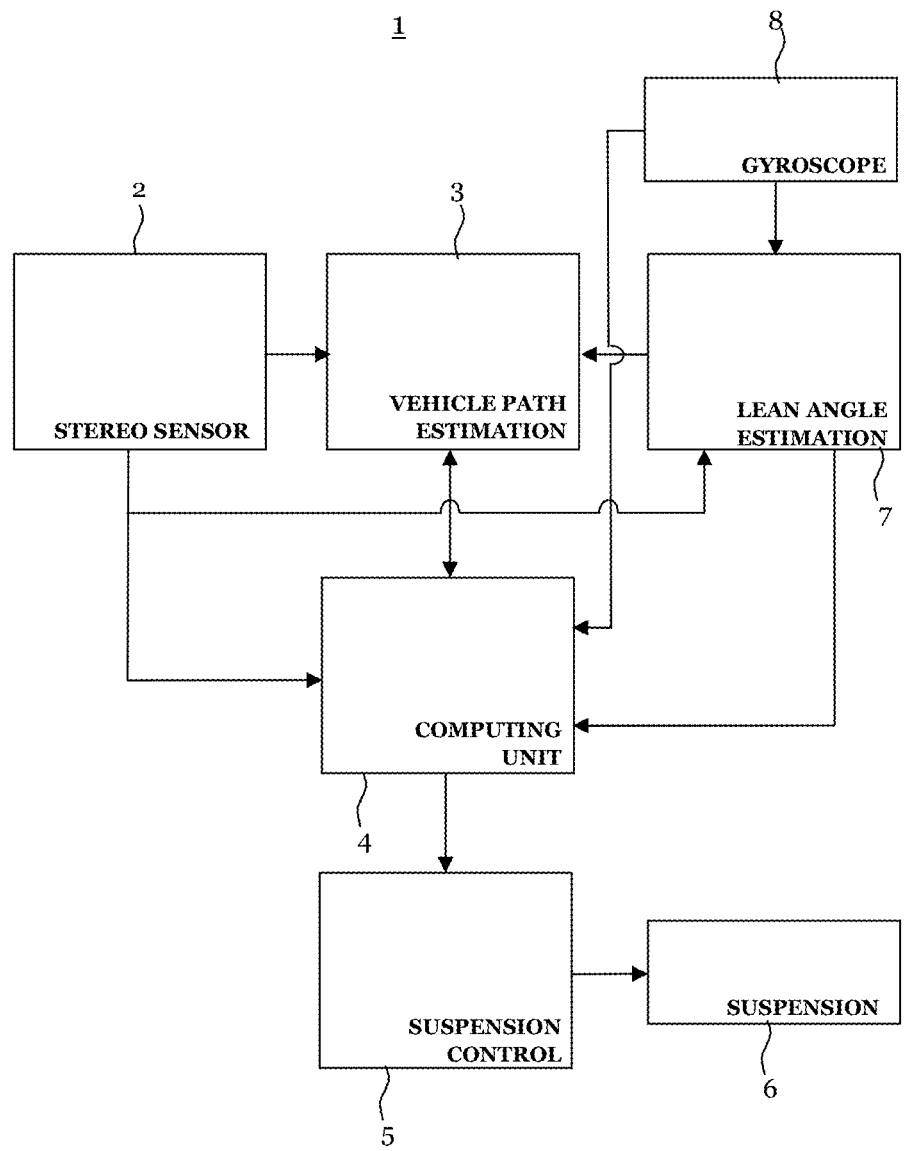
FIG. 1 depicts a system overview of the predictive suspension control system according to an embodiment.

In FIG. 1, a system overview of the predictive suspension control system 1 according to an embodiment is shown. The predictive system 1 for adapting a suspension 6 of a vehicle 52 comprises a stereo sensor unit 2 configured to generate image data. The stereo sensor unit 2 can be a stereo camera configured to generate a left and a right image. The stereo sensor unit 2 may include two mono cameras mounted in horizontally differing positions on the vehicle 52 (ego-vehicle). The stereo sensor unit 2 generates image data which images an area in a driving direction of the vehicle 52.

The image data is provided to a computing unit 4 which is configured to extract a relevant image portion from the image data. The relevant image portion is determined by the computing unit 4 based on future vehicle path data.

The future vehicle path data is provided by a vehicle path estimation unit 3, which is configured to generate the future vehicle path data as information over which areas shown in the image data the vehicle 52 in particular the wheels thereof will pass with a certain probability in a predetermined time extending into the future.

The computing unit 4 extracts the relevant image portion from the image data and calculates a road unevenness on a future vehicle path of the vehicle 52 based on the generated image data, or more precise on the extracted relevant image portion from the image data.

The road unevenness is calculated by fitting an even road model to the three-dimensional partial image data to calculate the road unevenness. For example a road model describing a flat plane is used and a difference value defining a difference between the flat road model plane and the calculated three-dimensional road data is determined. When the determined difference value exceeds a predefined threshold, a road surface irregularity is decided at a respective road position. The road unevenness may be a road unevenness profile for the future vehicle path. In particular the road unevenness may be a set of data for the predicted future path (trajectory) of wheels of the vehicle 52. The road unevenness includes for example each detected road surface irregularity detected in the predicted future wheel trajectory with its corresponding elevation height, elevation profile and local position in the predicted future wheel trajectory.

The computing unit 4 adapts a search direction of a stereo algorithm or a correlation area (correlation patch) of the stereo algorithm based on a lean angle of the vehicle 52 to generate three-dimensional partial image data from the relevant image portion. The stereo algorithm can for example be a block-matching algorithm or a semi-global matching algorithm as already known.

The lean angle of the vehicle 52 is provided by a lean angle estimation unit 7. The lean angle is an angle which is defined as an angle between a height axis of the vehicle 52 and the vertical axis on the ground plane of the road surface the vehicle 52 is travelling on. In particular for a single-track vehicle 52 the lean angle may be in a region of 30 degrees or more.

The road unevenness value is then provided by the computing unit 4 to a suspension control unit 5.

The suspension control unit 5 is configured to generate an adaptation signal for adapting the suspension 6 based on the calculated road unevenness. The adaptation signal is provided by the suspension control unit 5 to the suspension 6. The vehicle suspension 6 in FIG. 1 represents the individual assemblies which combine to the suspension 6 of the vehicle, such as damping units, suspension coils, whose suspension characteristics are to be adapted to the road conditions. The adaptation signal of an embodiment may include for each adaptable parameter of the suspension 6 a respective adaptation profile over time. The adaptation profile can include for a given time period from the time of generating the adaptation profile until the time when the vehicle 52 arrives at the end of the optical scanning range of the stereo sensor unit 2 a suitable adaptation strength of the suspension 6 or the respective suspension element.

The vehicle path estimation unit 3 may calculate the future vehicle path data from at least one of vehicle dynamic data and vehicle geometry data, lean angle and a vehicle speed of the vehicle 52 respectively.

The lean angle estimation unit 7 is configured to determine the lean angle based on data from a gyroscope 8 and/or a previous lean angle determined a predetermined time before and/or visual odometry.

The computing unit 4 fits, after the processing of the stereo image data to generate the three-dimensional partial image data, a plane according to a road model to the three-dimensional partial image data that has been generated from the stereo images. The computing unit 4 determines a deviation from the plane. The deviation is assumed to be a structural surface irregularity of the road surface. Plane estimates that are not consistent with the expectation, e.g. corresponding to impossible high lean angles, are rejected and neither used for detection nor for transforming images in the next time step of the image processing. In that case the image processing is done in the default mode illustrated in FIG. 3. Alternatively, the plane estimate from the last time step can be used as it can be assumed that a road orientation relative to the vehicle 52 changes slowly enough and that outliers are singular events.

The above two considerations of wheel track in the image data and lean angle of the vehicle 52 also tackle a further problem. At high vehicle speed the detection latency needs to be very small. Thus, the processing time for the image processing to generate the three-dimensional partial image data needs to be as small as possible. A major time-consuming part is the computation of the correlations between the left and right sensor image for extracting the three-dimensional data. Nowadays, the most efficient stereo algorithms are block-matching based methods and semi-global-matching. Especially, the block-matching based type of algorithms allow for very fast implementations. The already fast processing is enhanced by the selection of relevant scene portions. Since the processing time of the block-matching stereo algorithm is linear in the number of pixels each ignored pixel reduces the runtime accordingly.

Furthermore, the processing time is linear in the search range of the correlation search between the left and the right sensor images. Hence, it is very favourable to use the a road estimation from the previous time step of the image processing and the lean angle of the vehicle 52 to transform the sensor images based on this knowledge of the road estimation. A warping transformation brings the left and right sensor image closer together which results in a shortened search range for the implemented stereo algorithm which also reduces the processing time. This strongly reduced processing time due to relevant image portion selection and image transformation enables the low latency in surface irregularity detection that is necessary for high vehicle speeds.

Figure 2:
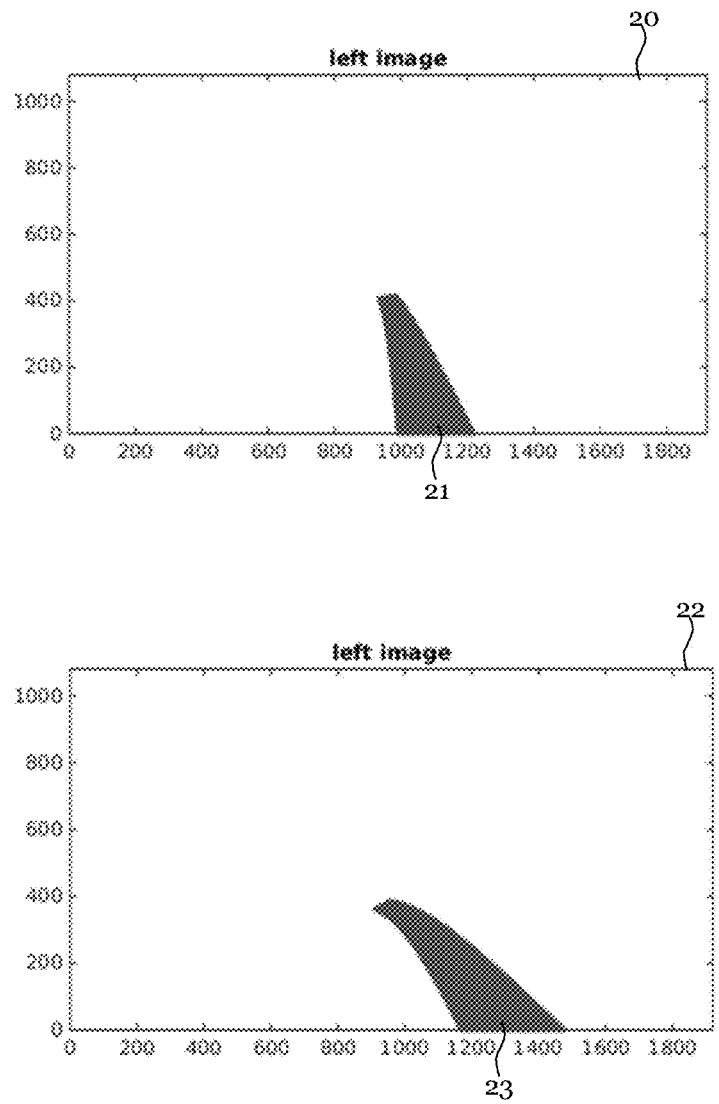
FIG. 2 shows single camera image with predicted wheel tracks for different vehicle lean angles of the vehicle.

In FIG. 2 two single camera images with predicted wheel tracks for different vehicle lean angles of the vehicle 52 are shown. The computing unit 4 extracts relevant subparts of the sensor images based on future vehicle path data provided by the vehicle path estimation unit 3.

The achieved effect is to limit the computational effort to a minimum by only processing relevant subparts of the images that means the predicted relevant image area the vehicle wheel will pass. In order to select the relevant image area, the geometry of the road relative to the camera has to be known roughly by either vehicle path (ego-vehicle trajectory) prediction or with the help of additional sensors. In particular for a motorcycle in contrast to cars a relative orientation between a motorcycle and the street can change very drastically due to the motorcycles capability to leaning which also leads to strong change of the relevant image portions. This can be seen when comparing the upper image in FIG. 2 with the lower part FIG. 2. The upper part of FIG. 2 provides a left image 20 obtained by a left camera of stereo sensor unit 2 including a left camera and a right camera. The stereo sensor unit 4 is mounted on a single-track vehicle such as a motorcycle. The left image 20 is captured for a lean angle of 10°. In the left camera image 20 a predicted wheel track 21 for the lean angle of 10° is shown. The lower part of figure provides a left image 22 obtained by a left camera of stereo sensor unit 2 including a left camera and a right camera. The left image 22 is captured for a leaning a lean angle of 30°, and thus larger than the lean angle when the upper left camera image 20 was captured. In the left camera image 22 a predicted wheel track 23 for the lean angle of 30° is shown. Comparing the predicted wheel track 21 with the predicted wheel track 23 shows that the relevant image parts are subject to particularly strong changes in case of single-track vehicles.

For estimating the future vehicle path by the vehicle estimation unit 3 three possibilities are proposed here.

The road geometry is known from previous 3D scanning by the stereo sensor unit 2. It can be assumed that the road does not significantly change its orientation from one time step to the next of a processing cycle of the prediction system.

The road geometry is known from previous 3D scanning by stereo cameras and the change in orientation from one time step to the next is measured by an additional sensor, e.g. the gyroscope 8.

The road geometry is known from previous 3D scanning by the stereo sensor unit 2 and the change in orientation from one time step to the next is measured by image processing in the computing unit 4. The processing algorithms of visual odometry per se are known from the art of robotics and may be applied here.

Generally the area in the obtained images for processing the image data is adapted such that the road is always scanned up to the same distance from the vehicle by the stereo sensor unit 2.

In principle, the full vehicle dynamics should be considered and a front wheel track should be computed based on the vehicle dynamics and vehicle geometry of the vehicle.

However, for most relevant driving conditions a simple approximation is sufficient if the wheel track is congruent with the vehicle moving direction.

Figure 3:
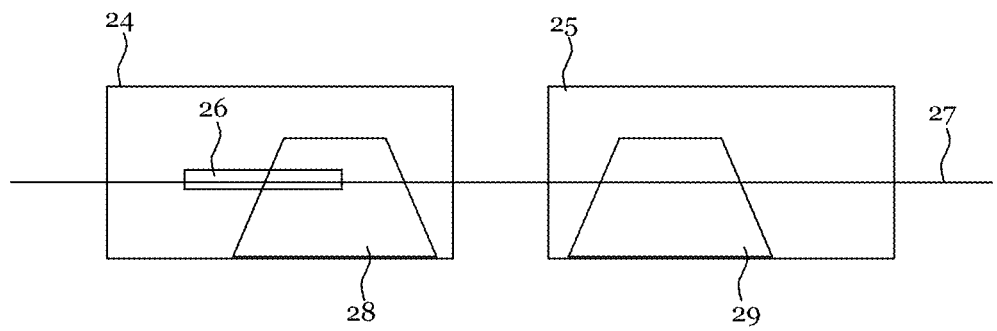
FIG. 3 shows stereo camera images acquired from a single track vehicle for a lean angle of 0°.
Figure 4:
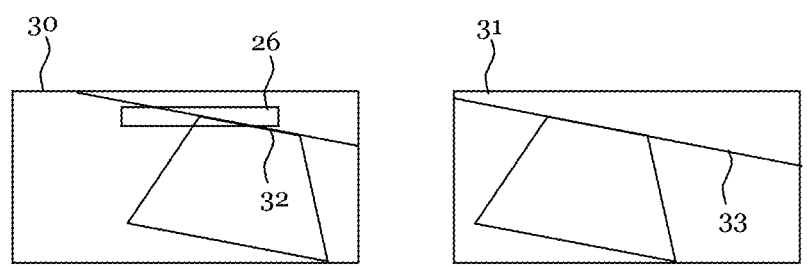
FIG. 4 shows stereo camera images acquired from a single track vehicle for a lean angle different from 0°.

In FIGS. 3 and 4 the effect of considering sensor image rotation for road surface reconstruction is discussed.

In FIG. 3 stereo camera images including a left sensor image 24 and a right sensor image 25 are shown. The left sensor image 24 and the right sensor image 25 are acquired by a stereo sensor unit 2 mounted on a single track vehicle for a lean angle of 0°.

Measuring the three-dimensional (3D-) position of a pixel using a stereo sensor 2 is performed by computing the disparity, for example by means of a stereo algorithm using a correlation between the left image 24 and the right image 25. The disparity corresponds to the displacement of pixels from the left sensor image 24 to the right sensor image 25 because of the different camera perspectives of the individual cameras forming part of the stereo sensor unit 2. As a single image pixel is not sufficient for reliable measurements, usually a pixel neighbourhood is used. A pixel neighbourhood is also termed as a patch 26. The challenge is to shape this patch 26 in a way, that the measurement is precise and, on the other hand, relying only on few pixels to avoid smoothing. The basic idea here is to take advantage of the known road geometry. In case the vehicle, for example a motorcycle is upright, the disparities on a line from the left outer part of the road to the right always have the same disparity value because they are at the same distance. That means the line of same disparities, not to be mixed up with the epipolar line, is aligned with the image lines. To get a precise but robust measure, the patch 26 used here is of a flat rectangular geometry. A flat patch geometry means that a low patch height is significantly smaller than the horizontal length of the patch 26. This patch geometry of the patch 26 enables to get a fine quantization in depth but wide to utilize the line of same disparities for robust measure as shown in FIG. 3.

In FIG. 3, images 24, 25 from a motorcycle in upright position are shown. The road 28 in the left image 24 and the road 29 in the right image 25 are captured from slightly different visual angles by the stereo sensor unit 2. The rectangular patch 26 is aligned with the image lines 27. Pixels along the image line 27 that lie within the road plane have the same disparity because they are at the same distance from the stereo sensor unit 2.

In FIG. 4 stereo images including a left image 30 and a right image 31 are shown. The left image 30 and the right image 31 are acquired by a stereo sensor unit 2 mounted on the single track vehicle for a lean angle for a lean angle different from 0°.

As soon as the vehicle, in particular the single-track goes into leaning position, the lines of same disparities are no longer aligned with the horizontal image lines 32 and 33 in the left image 30 and the right image 31 anymore. FIG. 4 shows stereo images 30, 31 from a motorcycle in leaning position. The rectangular patch 26 is no longer aligned with the orientation of pixels with same disparity shown by horizontal image lines 32 and 33 in the left image 30 and the right image 31.

According to an advantageous embodiment of the predictive suspension control system, the effect shown in FIG. 4 is overcome.

Figure 5:
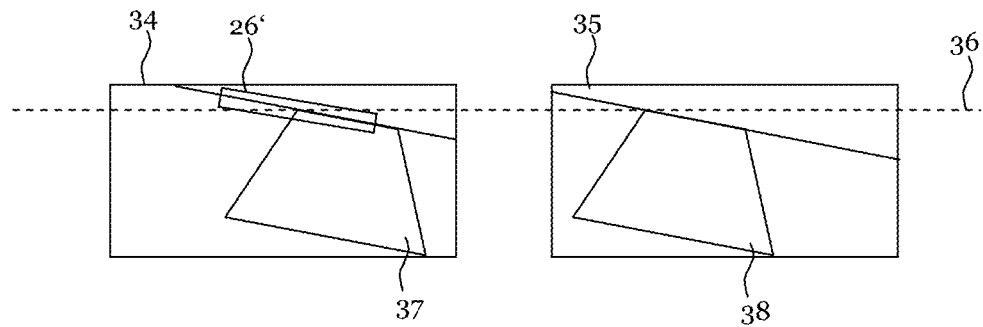
FIG. 5 shows stereo camera images acquired from a single track vehicle for a lean angle different from 0° with an adapted patch for applying a block based stereo algorithm.

In FIG. 5 stereo images 34, 35 from a motorcycle in leaning position are shown. The rectangular patch 26 is adapted according to the estimated lean angle of the motorcycle, which means it is rotated about the lean angle. As in FIG. 2, pixels along the orientation of the patch 26 are at the same distance if they correspond to the road 37, 38 and are hence easy to match.

The patch 26 is of rectangular geometry in FIG. 5 and is rotated using the knowledge of the plane geometry in front of the vehicle. This rotation of the rectangular patch 26 significantly improves the correlation measure conditions when applying the stereo algorithm onto the image data. This effect is achieved, because pixels along the orientation of the patch 26 are at the same distance if they correspond to the road. Hence they are not distorted in perspective. The pattern search process in FIG. 5 is performed along the epipolar line 36. The epipolar geometry is still to be regarded in order to achieve a correlation. Otherwise no correlation would be detected resulting no matching pixels in the left image 34 and the right image 35 would be found.

Rotated patches 26 are numerically inefficient for computation. According to a preferred embodiment of the predictive suspension control system, the effect shown in FIG. 6 is achieved by rotating the left and right images instead of rotating the patch 26.

Figure 6:
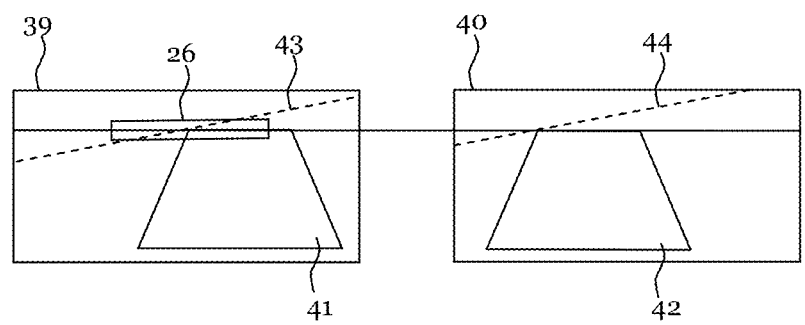
FIG. 6 shows stereo camera images acquired from a single track vehicle for a lean angle different from 0° with rotated images.

In FIG. 6, left and right sensor images 39, 40 obtained by the stereo sensor unit 2 mounted on a motorcycle in leaning position are shown. The left sensor image 39 and the right sensor image 40 are rotated around their centre by the angle of the plane. The patch search has now to be performed along the rotated epipolar lines 43, 44 (dashed lines) in the left and right sensor images 39, 40 depicted in FIG. 6.

Now there is no need to rotate the patch 26 and the patch matching can be computed efficiently. The disadvantage is that the search of the patch 26 has to be performed along the rotated epipolar lines 43, 44 shown as dashed lines in the left sensor image 39 and the right sensor image 40. Applying the stereo algorithm on the rotated left and right sensor images 39, 40 is easier to implement and significantly faster to process than the rotated patch 26' of FIG. 5.

Figure 7:
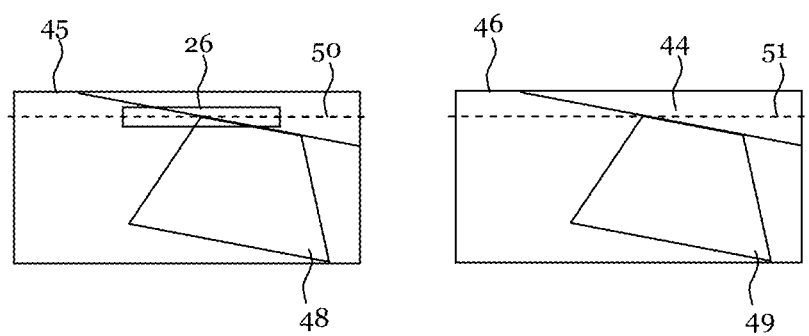
FIG. 7 shows stereo camera images acquired from a single track vehicle for a lean angle different from 0° wherein a right image is transformed.

In FIG. 7, the generation of the three-dimensional partial image data is shown by applying a stereo algorithm to a further advantageous embodiment is shown. Alternatively or in addition to the processing of the left and right images 34, 35, 39 and 40, the plane geometry in front of the vehicle can be used to transform one image to the other so that the road areas in the images are close to congruent.

In FIG. 7, left and right sensor images 45, 46 captured by a stereo sensor unit 2 mounted on a motorcycle in leaning position are shown. The right sensor image 46 is transformed so that the geometry of a road segment 49 in the right sensor image 46 becomes close to congruent with a geometry of a road segment 41 in the left sensor image 45.

In the case shown in FIG. 7, the disparities on the road should all be close to zero and hence a patch 26 in figure is easy to match. The transformation of the right image 46 is inverted after calculating the disparity measure. This method of plane transformation for improved disparity measure calculation is discussed in the published patent application US 2015/0228079 A1 "system and method for generating a depth map through iterative interpolation and warping", which hereby incorporated by reference for the implementation details of the plane transformation for improved disparity measure calculation as shown in FIG. 7.

The suspension control unit 5 generates an adaptation signal based on the unevenness value provided by the computing unit 4.

Based on the estimation of the three-dimension road surface structure represented by the road surface unevenness, an accordingly adapted control of the suspension 6 can be performed. Since a stereo sensor unit 2 can capture dense 3D information, it is possible to analyze the 3D structure of a road surface irregularity and adapt the suspension characteristics according to this determined 3D road surface structure. There are two main specific adaptations according to the 3D road surface structure that can be done. According to an embodiment, adaptation strength for the suspension 6 is adapted according to the height of the detected road surface irregularity. Furthermore the adaptation strength for the suspension 6 varies over time according to the 3D profile of the road surface irregularity. In case of the adapted adaptation strength the 3D height of the irregularity is computed from the deviation of the calculated three-dimensional partial image data including three-dimensional road surface information to an optimal flat street. A small deviation of the calculated road surface structure from the road model, for example of a flat street then leads to small adaptations in the suspension 6 while larger deviations lead to larger adaptations in the suspension 6. This advantage is achieved by using a stereo sensor unit 2 including for example a stereo camera over a mono-camera which cannot capture the 3D structure of a road in high detail, and the predictive suspension control processing as discussed before.

Figure 8:
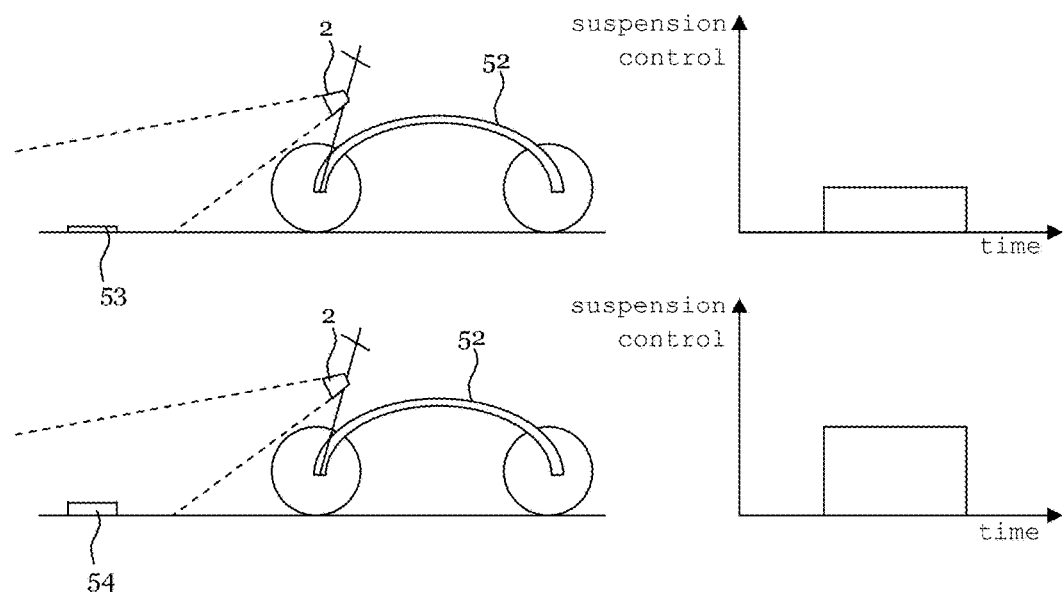
FIG. 8 shows a suspension control adaptation for different detected road surface irregularities.
Figure 9:
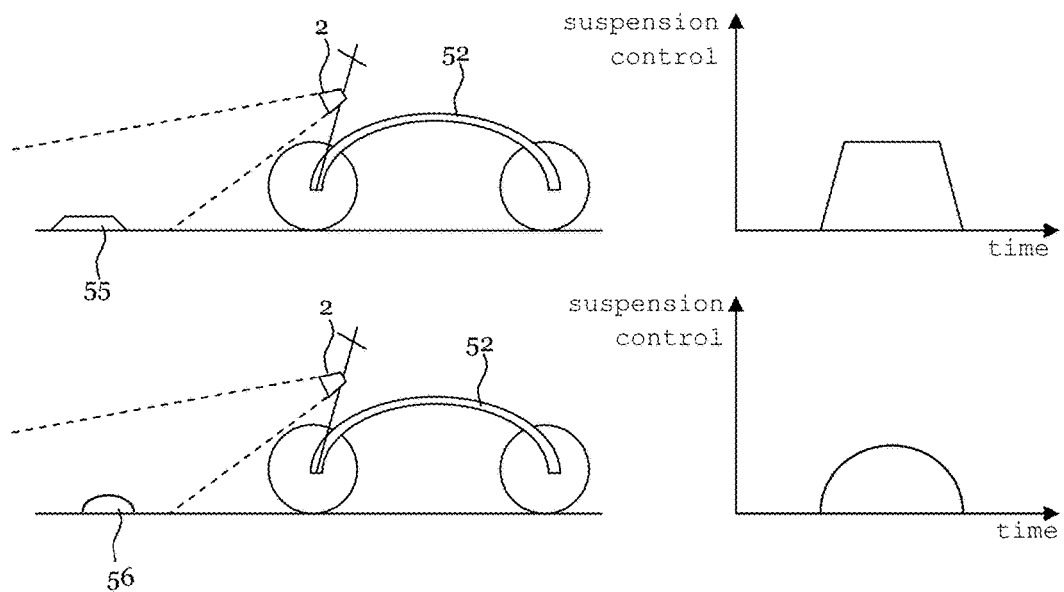
FIG. 9 shows a further suspension control adaptation for different detected road surface irregularities.

FIGS. 8 and 9 provide examples of the predictive suspension control according to an embodiment of the invention.

FIG. 8 shows how the strength of the adaptation signal for the suspension 6 is generated in dependence of the calculated height of a road surface irregularity. In the upper part of FIG. 8 a vehicle 52 detects a road surface irregularity 53 with a first height in a predicted vehicle path. The detected road surface irregularity 53 triggers the suspension control unit 5 to generate an adaptation signal for the suspension 6 which is shown in the upper right portion of the FIG. 8. The adaptation signal in the upper FIG. 8 has a first adaptation strength for a first adaptation time.

The adaptation signal in the lower FIG. 8 has a second adaptation strength for the first adaptation time. The first adaptation strength is smaller than the second adaptation strength. As the road surface irregularity 53 of the situation in the upper FIG. 8 is at the same distance from the vehicle 52 as the road surface irregularity 54 in the lower FIG. 8, the adaptation signal in the upper FIG. 8 shows the adaptation signal at the same time period to have a correspondingly adapted adaptation strength. This same time period in upper FIG. 8 and lower FIG. 8 for adapting the adaption strength results from the upper and lower FIG. 8 showing a vehicle 52 cruising with a same vehicle speed detecting the respective road surface irregularities 53, 54 at the same distances from the vehicle 52 in the three-dimensional image data at the same time.

Generally, FIG. 8 shows that a small road surface irregularity leads to a small adaptation strength in the adaptation signal and a large road surface irregularity lead to a large adaptation strength in the adaptation signal.

FIG. 9 shows that in a further embodiment of the predictive suspension control system three-dimensional road surface structure dependent adaptation of the suspension 6, a 3D profile of the irregularities 55, 56 is analyzed. It is of particular interest for the predictive suspension control system how the elevation profile evolves in a predicted vehicle path direction as the wheels of the vehicle 52 will pass over this elevation profile. From this calculated elevation profile and the driving speed of the vehicle 52, an adaptation profile over time to be included in the adaptation signal generated by the suspension control unit 5 is computed such that the suspension 6 has the suspension characteristics providing an optimal effect at each position of the road surface irregularity 55, 56. FIG. 9 gives a schematic impression how an adaptation signal for the suspension 6 is formed over time. The actual adaptation signal does not necessarily have exactly the same signal shape as the road surface irregularity contrary to the depicted situations in upper and lower FIG. 9.

Figure 10:
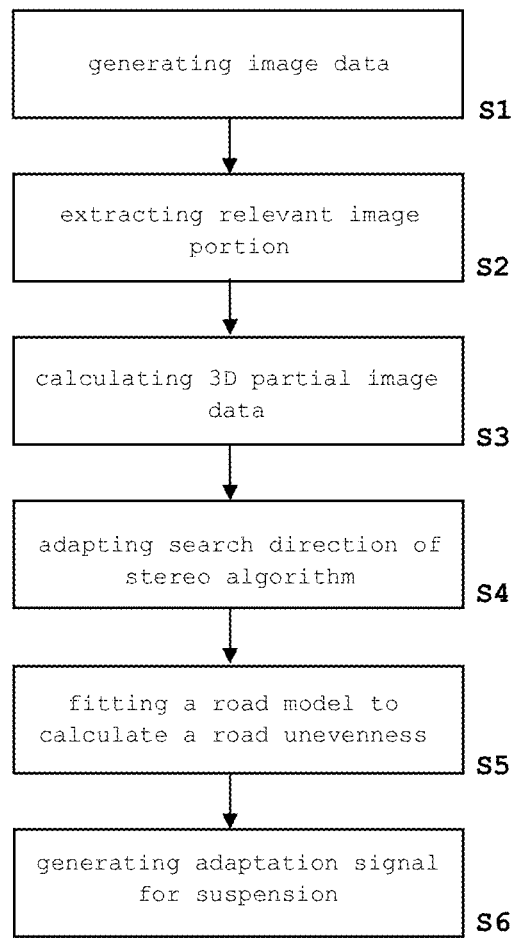
FIG. 10 shows a flowchart depicting processing steps of a predictive suspension control system using stereo a camera sensor according to an embodiment.

In FIG. 10 a flowchart depicting major processing steps of a predictive suspension control method using a stereo sensor unit 2 according to an embodiment of the invention is provided. A method for adapting the suspension 6 comprises a step S1 of the stereo sensor unit 2 generating image data. The computing unit 4 extracts in a succeeding step S2, a relevant image portion from the image data based on future vehicle path data. The future vehicle path data may be data generated by any driving assistance system providing a predicted ego-vehicle trajectory. In step S3, a search direction or a correlation area (correlation patch 26) of the stereo algorithm is adapted based on a lean angle of the vehicle 52 or the relevant image portion is warped according to an estimated road model. In a succeeding step S4, the computing unit 4 calculates three-dimensional partial image data by using the adapted stereo algorithm.

In step S5 the computing unit 4 fits a road model to the three-dimensional partial image data in order to calculate a road unevenness based on the three-dimensional partial image data. The calculated road unevenness may be a road elevation profile for a future vehicle path.

In step S6 succeeding to the step S5 the suspension control unit 5 uses the calculated road unevenness to determine a suitable adaptation signal with respective adaptation strength and adaptation profile over time for adapting the characteristics suspension 6 based on the calculated road unevenness.

The system and the method for controlling a vehicles suspension 6 as discussed before provide features of scanning the road unevenness in front of a motorcycle for adapting the suspension in a predictive manner to cope with the detected road surface irregularities providing a short reaction time and high adaptation precision.

The invention claimed is:

1. A system for adapting a suspension of a vehicle, the system comprising:
   a stereo sensor unit configured to generate image data,
   a computing unit configured to extract a relevant image portion from the image data based on future vehicle path data, and to calculate a road unevenness on a future vehicle path of the vehicle based on the generated image data,
   a suspension control unit configured to generate an adaptation signal for adapting the suspension based on the calculated road unevenness, and
   wherein the computing unit is configured to adapt a search direction of a stereo algorithm or a correlation area of the stereo algorithm based on a lean angle of the vehicle to generate three-dimensional partial image data from the relevant image portion, and
   to fit a road model to the three-dimensional partial image data to calculate the road unevenness.
2. The system according to claim 1, wherein
   the stereo sensor unit is a stereo camera.
3. The system according to claim 1, wherein
   the stereo sensor unit is configured to generate the image data which images an area in a driving direction of the vehicle.

4. The system according to claim 1, wherein the system comprises a vehicle path estimation unit configured to calculate future vehicle path data from at least one of vehicle dynamic data and vehicle geometry data.

5. The system according to claim 1, wherein the system comprises a vehicle path estimation unit configured to calculate future vehicle path data based on the lean angle and a vehicle speed.

6. The system according to claim 5, wherein the system comprises a lean angle estimation unit configured to determine the lean angle based on data from a gyroscope, a previous lean angle determined a predetermined time before, or visual odometry.

7. The system according to claim 1, wherein the stereo algorithm is a block-matching algorithm or a semi-global matching algorithm.

8. The system according to claim 1, wherein the image data comprises a first image and a second image, and
that the computing unit is configured to generate three-dimensional partial image data by transforming the relevant portion of the first image to the second image based on a previous road model estimation.

9. The system according to claim 8, wherein the first image is a left image and the second image is a right image, or the first image is a right image and the second image is a left image.

10. The system according to claim 7, wherein the computing unit is configured to adapt at least one of a filter size, a filter shape, and a filter orientation of the stereo algorithm based on the lean angle.

11. The system according to claim 8, wherein the computing unit is configured to rotate the first image and the second image.

12. The system according to claim 1, wherein the road model is a planar model.

13. The system according to claim 1, wherein the computing unit is configured to determine uneven road sections based on the three-dimensional partial image data and the road model.

14. The system according to claim 1, wherein the computing unit is configured to calculate a three-dimensional elevation map based on the three-dimensional partial image data and the road model.

15. The system according to claim 1, wherein the computing unit is configured to calculate the road unevenness based on a distance of each data point of the three-dimensional partial image data to a corresponding model data point of the fitted road model.

16. The system according to claim 1, wherein the suspension control unit is configured to generate the adaptation signal further based on a distance of the vehicle at a time when generating the image data to a detected unevenness in the future vehicle path, based on a vehicle velocity.

17. The system according to claim 1, wherein the suspension control unit is configured to generate the adaptation signal further taking into account an influence of the calculated road unevenness in the future vehicle path of the vehicle.

18. The system according to claim 1, wherein the computing unit is configured to calculate the road unevenness as a three-dimensional road surface profile, and
that the suspension control unit is configured to generate the adaptation signal as a suspension adaptation profile over time based on the three-dimensional road surface profile.

19. The system according to claim 1, wherein the vehicle is a two-wheel vehicle.

20. A method for adapting a suspension of a vehicle, the method comprising the steps of:
generating, by a stereo sensor unit, image data,
extracting, by a computing unit, a relevant image portion from the image data based on future vehicle path data,
calculating, by the computing unit, three-dimensional partial image data by using a stereo algorithm,
adapting a search direction of the stereo algorithm or a correlation area of the stereo algorithm to generate three-dimensional image data based on a lean angle of the vehicle,
fitting, by the computing unit, a road model to the three-dimensional partial image data to calculate a road unevenness based on the three-dimensional partial image data, and
generating, by a suspension control unit, an adaptation signal for adapting the suspension based on the calculated road unevenness.

21. A computer program embodied on a non-transitory computer-readable medium, said computer-readable medium including program-code thereupon, said program-code, when executed on a computer or digital signal processor, executing the method according to claim 20.

* * * * *